Sept. 7, 1943.   E. A. WEISS   2,328,868
MOTOR VEHICLE
Filed July 21, 1942
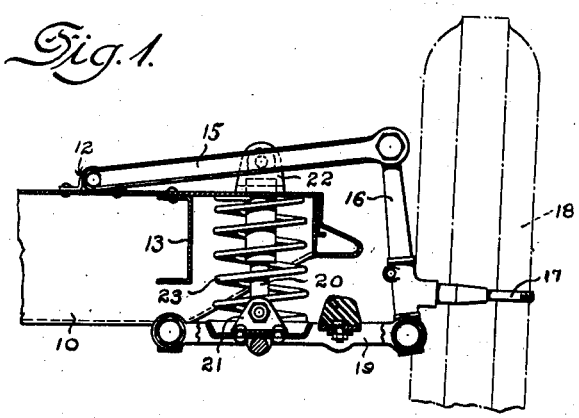
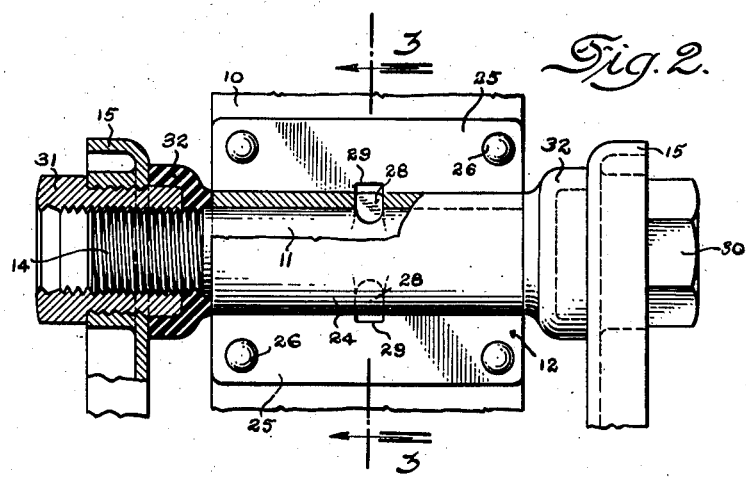
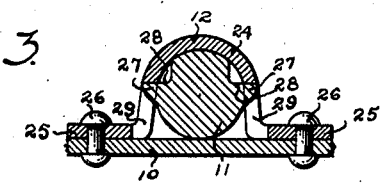
INVENTOR.
Erwin A. Weiss
BY Tibbetts + Hart
Attorneys.

Patented Sept. 7, 1943

2,328,868

UNITED STATES PATENT OFFICE 2,328,868

MOTOR VEHICLE

Erwin A. Weiss, Detroit, Mich., assignor to Packard Motor Car Company, Detroit, Mich., a corporation of Michigan Application July 21, 1942, Serial No. 451,803

6 Claims. (Cl. 287—100)

This invention relates to pivot devices and more particularly to pivot rod securing structure.

An object of the invention is to provide a pivot rod securing structure consisting of relatively few parts that can be readily assembled.

Another object of the invention resides in securing a pivot rod by a bracket arranged to prevent turning and axial movements of the rod.

Another object of the invention is to form a pivot rod and a hold down bracket with interrelated portions arranged to prevent axial and rotative movements of the rod when applied to a base member.

Other objects of the invention will appear from the following description taken in connection with the drawing, which forms a part of this specification, in which:

Fig. 1 is a fragmentary sectional view of a motor vehicle chassis showing wheel linkage incorporating the invention;

Fig. 2 is a plan view of the pivot device for the upper link of the wheel linkage;

Fig. 3 is a sectional view of the pivot device taken on line 3—3 of Fig. 2.

The pivot device, forming the subject matter of the present invention, consists of a base member 10, a pivot rod 11 and a bracket 12 securing the rod on the base member. This pivot device can be used for many purposes and in the accompanying drawing the device is shown as part of a motor vehicle wheel supporting mechanism.

The base member 10 can be one of the cross frame members of a vehicle chassis which includes frame side members as indicated by numeral 13. The pivot rod ends 14 are threaded and project beyond the bracket to pivotally support arms 15 of an upper wishbone link which is pivotally connected with the upper end of kingpin 16. The kingpin carries axle 17 on which wheel 18 is mounted, and the lower end of the kingpin is pivoted to wishbone link 19 that is pivoted to the cross frame member 10. Shock absorber 20 is connected at one end to bracket 21 on the lower wishbone link and at the other end to bracket 22 on the cross frame member. Coil spring 23 encircles the shock absorber and bears at one end against the lower wishbone link and at the other end against the cross frame member. One of the arms 15 is screwed on a threaded end of the pivot rod and retained thereon by nut 30. The other arm 15 telescopes the other end of the pivot rod and sleeve 31 screws into this arm and on the adjacent rod end. Rubber gasket members 32 are arranged to enclose the spaces between the bracket and the arms 15.

The central portion of the pivot rod is arranged to be supported on the base member, preferably directly thereon, and engaged by a looped portion 24 of bracket 12. The bracket has flat portions 25 projecting from the looped portion that are secured against the top of the base member by suitable means, such as rivets 26. A pair of oppositely disposed projections 27 are formed on the central unthreaded portion of the pivot rod, preferably by striking out metal to form ears having flat upper surfaces 28. The legs of the looped portion of the bracket are formed to provide guideways for the rod projections, and such guideways can take the form of oppositely disposed slots 29 extending outwardly from the flat portions of the bracket. These slots are arranged to receive the rod projections when the bracket is applied to the base member over the rod, and they are of substantially the same width as the projections so that the rod is restrained from moving in an axial direction when secured by the bracket. The slots are of such length that the flat faces of the rod ears will engage against the bracket defining the outer ends thereof when the rod is engaged by the looped portion of the bracket and bearing against the base member. Thus, when the bracket is applied over the rod and secured to the base member, this engagement of the flat surfaces of the ears with the bracket at the outer ends of the slots will prevent rotative movement of the rod and also movement of the rod in a direction away from the base member.

The pivot device consisting of the base member, pivot rod and bracket can be readily assembled and secured together and the rod will be restrained from movement solely through its interengaging relation with the bracket and base member.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A pivot device comprising a base member, a pivot rod supported by the base member, a bracket fixed to the base member and having a portion looped over said rod formed with slots, and means on the rod projecting into the slots in the looped portion of said bracket to retain the rod from rotative or axial movement.

2. A pivot device comprising a base member, a pivot rod supported by the base member, a bracket fixed to the base member and having a portion looped over and fitting against said rod, said looped portion being formed with oppositely disposed guideways, and means on the rod projecting into the guideways to prevent axial and rotative movements of the rod.

3. A pivot device comprising a base member, a pivot rod resting on the base member, a bracket having a central portion looped over the rod, the legs of the looped portion having slots therein, means projecting from the rod and extending into the slots in the loop portion of the bracket to prevent rotative movement of the rod, and means securing the end portions of the bracket to the base member.

4. A pivot device comprising a base member, a pivot rod resting on the base member and having a pair of oppositely disposed ears projecting therefrom, a bracket having a loop portion fitting over the rod and slotted to receive the rod ears, said ears engaging with the loop portion of the bracket to prevent axial and rotative movements of the rod, and means securing the bracket to the base member with the loop portion fitting tightly against the rod.

5. A pivot device comprising a base member, a pivot rod supported on the base member, oppositely disposed projections struck out from the rod having a flat upper surface, a bracket having end portions resting against the base member and a looped intermediate portion fitting against the rod, the legs of said looped portion having slots formed therein to receive the rod projections when the bracket is assembled over the rod, the flat faces of the projections on the rod engaging the bracket at the outer ends of the slots to prevent rotative movement thereof, and means securing the end portions of the bracket to the base member.

6. A mounting for a motor vehicle wheel supporting link comprising a vehicle frame member, a pivot rod resting on the frame member, a bracket fixed to the frame member in a relation to overlie a portion of the rod, said bracket being formed with oppositely disposed guideways, and ears struck from the rod in relation to project into the bracket guideways.

ERWIN A. WEISS.